(12) United States Patent  (10) Patent No.: US 7,077,449 B2
Tokunaga  (45) Date of Patent: Jul. 18, 2006

(54) MOUNTING STRUCTURE OF A VEHICLE INTERIOR PART

(75) Inventor: Shinya Tokunaga, Seto (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 10/490,957

(22) PCT Filed: Sep. 26, 2002

(86) PCT No.: PCT/IB02/03963

§ 371 (c)(1),
(2), (4) Date: Mar. 26, 2004

(87) PCT Pub. No.: WO03/029051

PCT Pub. Date: Apr. 10, 2003

(65) Prior Publication Data

US 2004/0245798 A1     Dec. 9, 2004

(30) Foreign Application Priority Data

Sep. 27, 2001   (JP)  ............................. 2001-296377

(51) Int. Cl.
*B62D 25/04* (2006.01)
*B60R 13/02* (2006.01)

(52) U.S. Cl. .............................. 296/39.1; 296/193.06; 296/203.03; 296/187.05

(58) Field of Classification Search ............... 296/39.1, 296/187.05, 187.09, 187.12, 203.02, 203.03, 296/193.06
See application file for complete search history.

(56) References Cited

U.S. PATENT DOCUMENTS 5,934,729 A * 8/1999 Baack ........................ 296/39.1
6,196,607 B1 * 3/2001 Gulisano ................... 296/39.1

(Continued)

FOREIGN PATENT DOCUMENTS

JP          U-2-2512        1/1990

(Continued)

OTHER PUBLICATIONS

Office Action dated Aug. 31, 2004 in Japanese Patent Application No. 2001-296377 and English Translation of Examiners Comment.

*Primary Examiner*—D. Glenn Dayoan
*Assistant Examiner*—Greg Blankenship
(74) *Attorney, Agent, or Firm*—Finnegan, Henderson, Farabow, Garrett & Dunner, LLP

(57) ABSTRACT

A mounting device (30) for mounting a vehicle interior part (20) to a vehicle body 10 includes a first engaging portion (31), a second engaging portion (32), and a movement limiting portion (33). The first engaging portion (31) is engaged and thus fixed to the vehicle body (10) so as to be kept from being disengaged therefrom under a predetermined load. The second engaging portion (32) is engaged and thus fixed to the interior part (20) so as to be disengaged therefrom under the predetermined load. While the second engaging portion (32) is engaged with the interior part (20), the movement limiting portion (33) is kept within an interior space (22) formed in the interior part (20). When the interior part is detached and moves away from the vehicle body (10), the movement limiting portion (33) prevents the interior part (20) from moving away from the vehicle body (10) by a distance exceeding a predetermined value.

7 Claims, 5 Drawing Sheets

U.S. PATENT DOCUMENTS

| | | | |
|---|---|---|---|
| 6,394,536 B1 * | 5/2002 | Takahara | 296/187.05 |
| 6,431,584 B1 * | 8/2002 | Nagasawa et al. | 280/728.2 |
| 6,664,470 B1 * | 12/2003 | Nagamoto | 174/65 G |
| 6,813,865 B1 * | 11/2004 | Peterson | 52/506.05 |
| 6,832,800 B1 * | 12/2004 | Hwang | 296/39.1 |
| 2003/0022441 A1 * | 1/2003 | Ogura et al. | 438/257 |
| 2003/0094828 A1 * | 5/2003 | Nagamoto | 296/39.1 |
| 2003/0146607 A1 * | 8/2003 | Ohki | 280/730.2 |

FOREIGN PATENT DOCUMENTS

| | | |
|---|---|---|
| JP | U-2-46107 | 3/1990 |
| JP | 2001-039260 | 2/2001 |
| WO | WO 99/67542 | 12/1999 |

* cited by examiner

MOUNTING STRUCTURE OF A VEHICLE INTERIOR PART

BACKGROUND OF THE INVENTION

1. Field of Invention

The invention relates to a mounting structure of a vehicle interior part in which the vehicle interior part is mounted to a vehicle body using a fixing device.

2. Description of Related Art

A mounting structure of a vehicle interior part is disclosed in WO99/67542. In this mounting structure, an interior part is mounted onto a vehicle body with a fixing device (a clip) having a portion engaged with the vehicle body (vehicle body-side engaging portion), a portion engaged with the interior part (an interior part-side engaging portion), and a flexible strap that connects the vehicle body-side engaging portion and the interior part-side engaging portion. The force generated by the engagement of the interior part-side engaging portion with a protrusion formed in the vehicle body side engaging portion, that is, pulling resistance, is set to be smaller than the force generated by the engagement of the vehicle body-side engaging portion with the vehicle body. When a predetermined force that removes the interior parts acts upon the protrusion formed on the vehicle body side, the interior part-side engaging portion is disengaged from the protrusion. Upon movement of the interior part away from the vehicle body, the strap serves to keep the interior part from moving away from the vehicle body by a distance equal to or greater than a predetermined value.

In the conventional mounting structure as described above, at the time of or after mounting the interior part to the vehicle body, the strap that connects the vehicle body-side engaging portion and the interior part-side engaging portion may interfere with mounting the interior part to the vehicle body smoothly. Besides, a portion between the vehicle body-side engaging portion and the strap or between the interior part-side engaging portion and the strap may be twisted and broken when the interior part is detached away from the vehicle body.

SUMMARY OF THE INVENTION

The mounting structure adapted to mount an interior part for a vehicle on a body of the vehicle includes a first engaging portion that is engaged with and fixed to the body of the vehicle, the first engaging portion being kept from disengaged from the body of the vehicle under a predetermined load, a second engaging portion that is connected to the first engaging portion, the second engaging portion being engaged with and fixed to the interior part, and disengaged from the interior part under the predetermined load, and a movement limiting portion that is connected to the second engaging portion and stored in an interior space formed in the interior part in a state where the second engaging portion is engaged with the interior part. The movement limiting portion limits a movement of the interior part away from the body of the vehicle by a distance that is equal to or greater than a predetermined distance when the second engaging portion is disengaged from the interior part so as to be moved away from the body of the vehicle.

The movement limiting portion has an end portion that is movable in the interior space in which the movement limiting portion is kept. The first engaging portion is provided on a first end of the mounting structure, the second engaging portion is provided on an intermediate portion of the mounting structure, and the movement limiting portion is provided on a second end of the mounting structure.

The movement limiting portion includes an end that serves as an anchor portion engaged with the interior part so as to limit the movement of the interior part, and a flexible portion that connects the anchor portion and the second engaging portion. The second engaging portion and the movement limiting portion have substantially flat shapes that extend in different directions.

According to the embodiment of the invention, in the state where the interior part is mounted on the vehicle body, the first engaging portion is engaged with and fixed to the vehicle body, the second engaging portion is engaged with and fixed to the interior part, and the movement limiting portion is placed within the interior space formed in the interior part. When a predetermined load (pulling strength) acts upon the interior part, the second engaging portion is disengaged from the interior part while the first engaging portion is kept from being disengaged from the interior part. When the interior part moves away from the vehicle body, the movement limiting portion serves to limit movement of the interior part from the vehicle body by the distance equal to or greater than a predetermined value.

In the case where the second engaging portion of the mounting device is engaged with the interior part, the movement limiting portion does not interferes with mounting the interior part to the vehicle body because it is placed within the interior space formed in the interior part.

When the movement limiting portion is placed in the interior space formed in the interior part, the end of the movement limiting portion is allowed to move within the interior space. It is unlikely that the movement limiting portion is twisted when the interior part is moved away from the vehicle body, enhancing the breaking strength.

The first engaging portion, the second engaging portion and the movement limiting portion are formed on one end, an intermediate position, and the other end of the mounting structure, respectively. In the above-described structure, the second engaging portion can be engaged with a part of the interior space of the interior part in the state where the movement limiting portion is placed within the interior space of the interior part. The interior space of the interior part may partially serve as a portion with which the second engaging portion is engaged. This makes it possible to simplify the structure of the interior part, improving mounting performance.

A tip of the end of the movement limiting portion is formed as an anchor portion which is engaged with the interior surface of the interior part so as to limit the movement thereof. A joint portion that connects the anchor portion and the second engaging portion is formed as an elastic member. The joint portion is capable of absorbing the impact caused by the movement of the interior part away from the vehicle body. Furthermore, as the anchor portion is engaged with the interior surface of the interior part, the movement of the interior part can be limited reliably.

The second engaging portion and the anchor portion of the movement limiting portion have substantially flat shapes that extend in different directions. This makes it possible to bring the interior part having the hole with which the second engaging portion is engaged into engagement with the anchor portion with sufficient strength, limiting the movement of the interior part away from the vehicle body.

BRIEF DESCRIPTION OF THE DRAWINGS

The foregoing and/or further objects, features and advantages of the invention will become more apparent from the following description of preferred embodiments with reference to the accompanying drawings, in which like numerals are used to represent like elements and wherein.

DETAILED DESCRIPTION OF PREFERRED EMBODIMENTS

Figure 1:
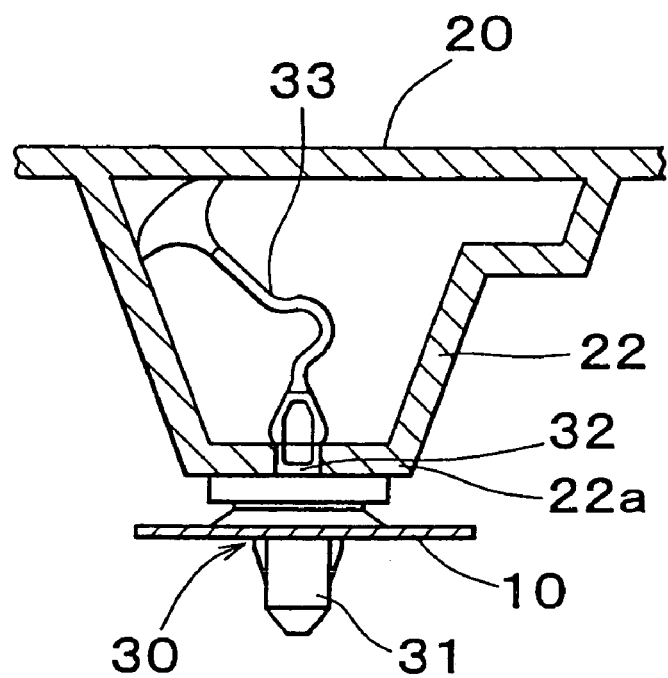
FIG. 1 is a view showing one embodiment of a mounting structure of a vehicle interior part according to the invention.
Figure 2:
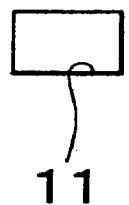
FIG. 2 is a view showing a mounting hole formed in a pillar shown in FIG. 1.

Hereinafter, an embodiment of the invention will be described with reference to the accompanying drawings. FIG. 1 shows a pillar garnish 20 as a vehicle interior part which is mounted onto a pillar 10 of a vehicle body using a mounting device 30. A rectangular mounting hole 11 shown in FIG. 2 is formed in the pillar 10 while a trapezoidal interior space 22 including a rectangular mounting hole 21 shown in FIG. 3 formed in the lower end is formed in the pillar garnish 20.

As shown in FIGS. 4 to 10, the mounting device 30 includes a first engaging portion 31 at one end thereof (lower end portion shown in FIG. 4), a second engaging portion 32 at an intermediate portion thereof, and a movement limiting portion 33 at the other end thereof, which are integrally formed of a synthetic resin material (e.g. fiber reinforced nylon). The first engaging portion 31 includes a hood-like portion 31a and a pair of engaging claws 31b. The hood-like portion 31a is adapted to elastically abut on an annular circumference of an inner surface of the pillar 10, and each of the engaging claws 31b is adapted to elastically deform and pass through the mounting hole 11 to be engaged with an outer surface of the pillar 10. The first engaging portion 31 as aforementioned is engaged with and fixed to the pillar 10 when it is fitted into the mounting hole 11 of the pillar 10, so as to be kept from being disengaged from the pillar 10 when a predetermined load (pulling force) is applied.

The second engaging portion 32 includes a rectangular base plate 32a and a pair of engaging claws 32b. The rectangular base plate 32a is adapted to abut on an outer surface of the interior space 22 and each of the engaging claws is adapted to elastically deform and pass through the mounting hole 21 and to fit to an inner surface of the interior space 22. A portion 32c in which a pair of the engaging claws 32b are formed has a substantially flat shape. The second engaging portion 32 is fitted into the mounting hole 21 of the pillar garnish so as to be engaged with and fixed to a portion 22a of the interior space 22 of the pillar garnish. The portion 32c of the second engaging portion 32 is disengaged from the interior space 22 when a predetermined load (pulling force) is applied.

The movement limiting portion 33 includes an anchor portion 33a and a flexible portion 33b. The anchor portion 33a is provided at one end of the movement limiting portion 33 and is adapted to limit the movement of the pillar garnish 20 when it is engaged with the portion 22a of the interior space 22. The flexible portion 33b is provided as the joint space that connects the anchor portion 33a and the second engaging portion 32. The flexible portion 33b includes a flexible curved portion with a flat band-like shape at the intermediate position. While the second engaging portion 32 is engaged with the pillar garnish 20 as shown in FIG. 1, the movement limiting portion 33 is kept within the interior space 22. Upon disengagement of the second engaging portion 32 from the pillar garnish 20, the pillar garnish 20 is detached from the pillar 10. Then the movement limiting portion 33 functions to prevent the pillar garnish 20 from moving away from the pillar 10 by a distance that exceeds a predetermined value.

Figure 3:
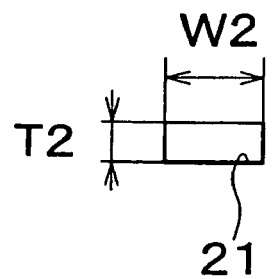
FIG. 3 is a view showing a mounting hole formed in a pillar garnish shown in FIG. 1.
Figure 4:
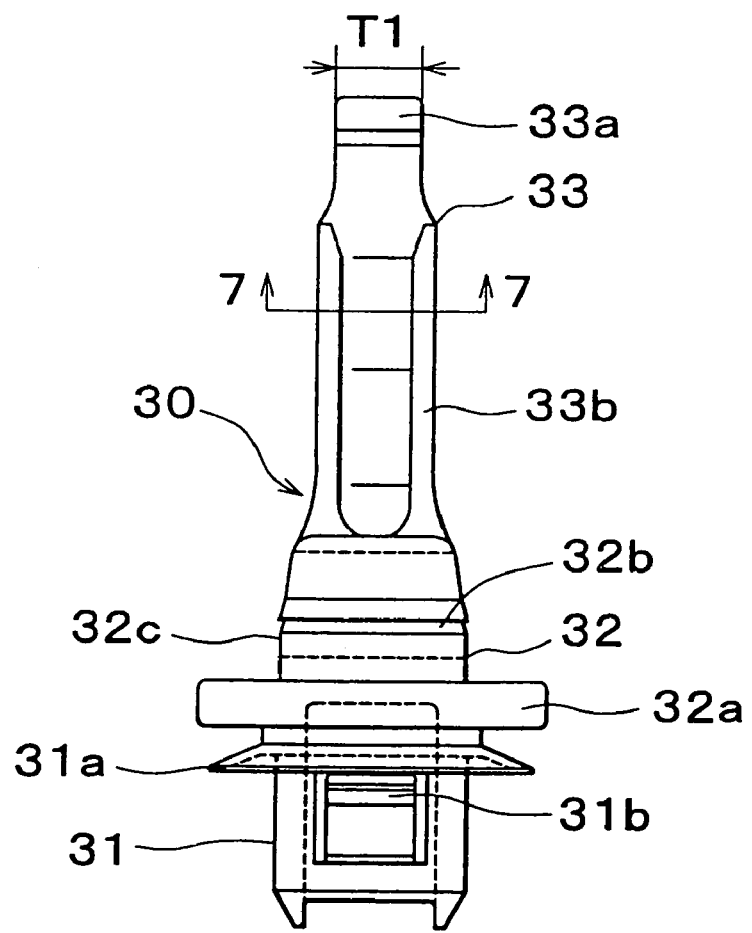
FIG. 4 is a front view of a mounting device itself shown in FIG. 1.
Figure 5:
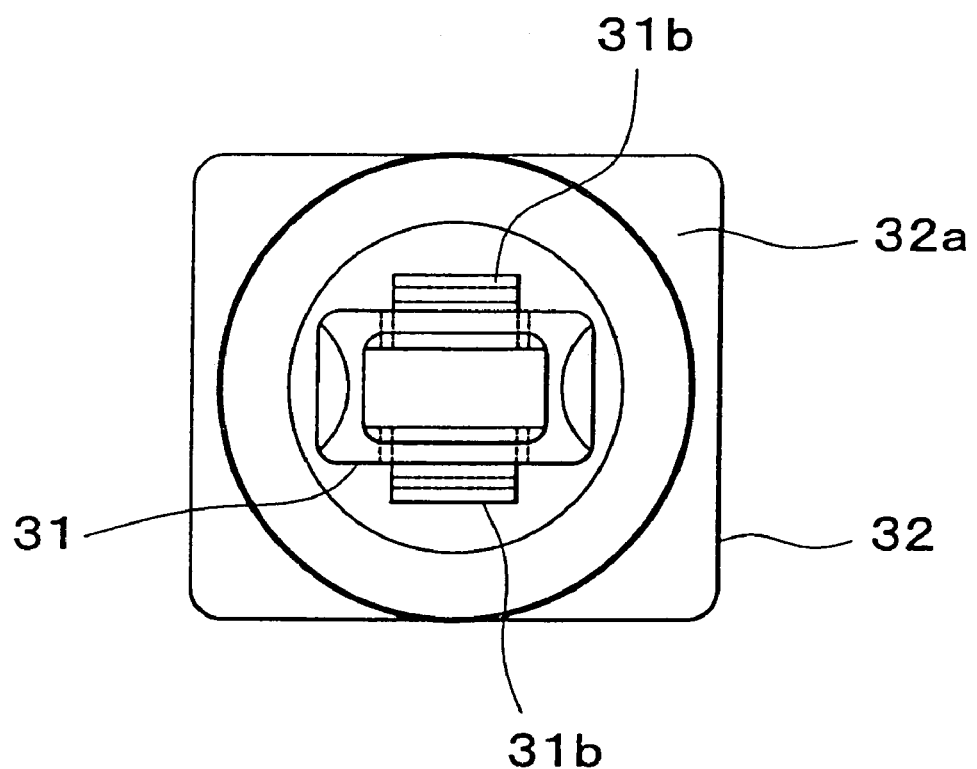
FIG. 5 is a bottom view of the mounting device shown in FIG. 4.
Figure 6:
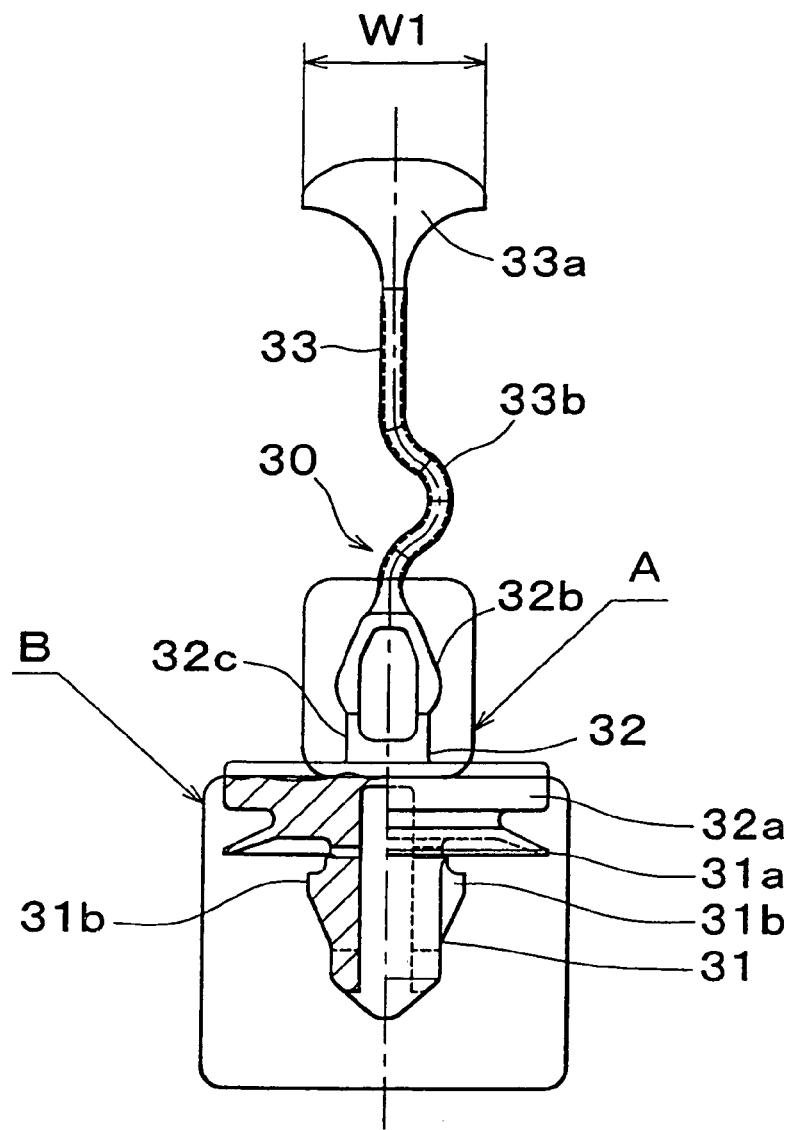
FIG. 6 is a partially broken side view of the mounting device shown in FIG. 4.
Figure 7:
FIG. 7 is a sectional view taken along line 7—7 of FIG. 4.
Figure 8:
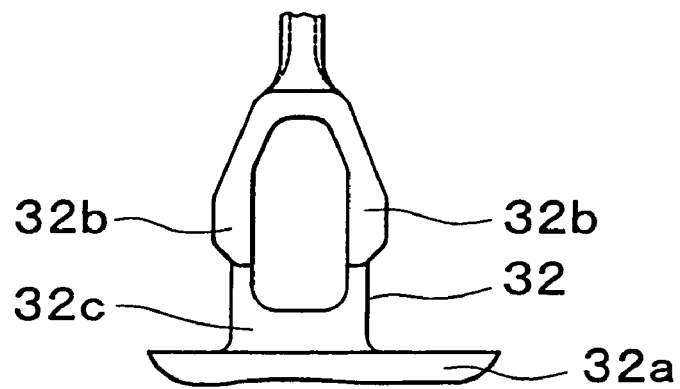
FIG. 8 is an enlarged view of portion A of FIG. 6.
Figure 9:
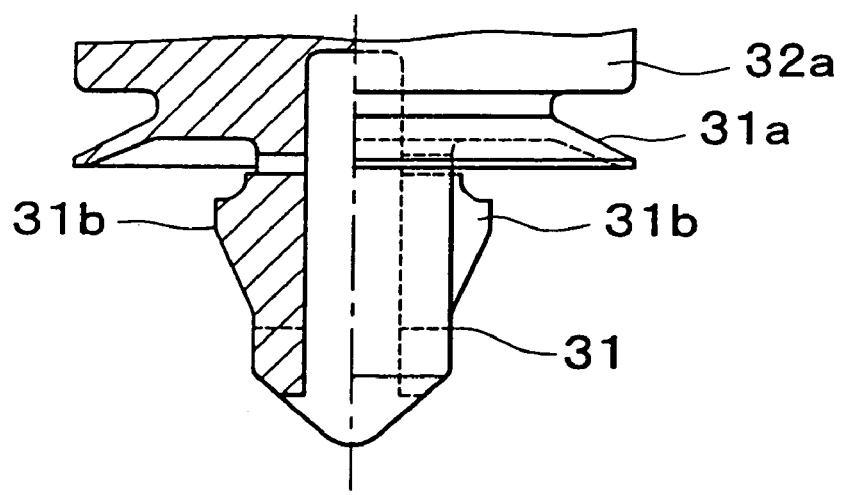
FIG. 9 is an enlarge view of portion B of FIG. 6.

Referring to FIGS. 4 to 6, the anchor portion 33a of a fan-like flat shape has a width W1 (smaller than W2 as the length of the long side of the mounting hole 21 shown in FIG. 3) and has a thickness T1 (smaller than T2 as the length of the short side of the mounting hole 21 shown in FIG. 3). The direction in which the flat shape of the anchor portion 33a extends is different from the direction in which the flat shape of the portion 32c extends by 90 degrees. Besides, the anchor portion 33a is placed within the interior space 22 of the pillar garnish 20 such that the anchor portion 33a is not constrained but movable therein as shown in FIG. 1.

In this embodiment, the anchor portion 33a of the mounting device 30 is first inserted into the mounting hole 21 of the pillar garnish 20. The mounting device 30 is then turned 90 degrees such that the flexible portion 33b of the mounting device 30 is inserted into the mounting hole 21 of the pillar garnish 20. Then, both engaging claws 32b and the portion 32c of the second engaging portion 32 are fit to the mounting hole 21 of the pillar garnish 20 under pressure so as to engage both the engaging claws 32b with the inner surface of the storing portion 22. Accordingly the mounting device 30 is installed to the interior space 22 of the pillar garnish 20.

In a state where the mounting device 30 is installed to the interior space 22 of the pillar garnish 20, both engaging claws 31b of the first engaging portion 31 are secured to the outer surface of the pillar 10 by fitting those engaging claws 31b to the mounting hole 11 of the pillar 10 under pressure. The pillar garnish 20, thus, can be mounted to the pillar 10 using the mounting device 30.

In this embodiment, when the pillar garnish 20 is mounted on the pillar 10 using the mounting device 30, the first and the second engaging portions 31, 32 of the mounting device 30 remain engaged and fixed with the pillar 10 and the pillar garnish 20, respectively. The movement limiting portion 33 of the mounting device 30 is kept within the interior space 22 of the pillar garnish 20 as shown in FIG. 1.

When a predetermined load (pulling force) is applied to the above-described pillar garnish 20, the second engaging portion 32 of the mounting device 30 is disengaged from the interior space 22 of the pillar garnish 20 in the state where the first engaging portion 31 of the mounting device 30 is engaged with the pillar 10. The pillar garnish 20 is then detached and moves away from the pillar 10. At this time, the pillar garnish 20 is prevented from moving away from the pillar 16 by a distance that exceeds a predetermined value by the movement limiting portion 33 of the mounting device 30.

As described above, in the embodiment, in the state where the second engaging portion 32 of the mounting device 30 is engaged with the interior space 22 of the pillar garnish 20, the movement limiting portion 33 of the mounting device 30 is kept within the interior space 22 of the pillar garnish 20. As a result, the mounting device 30 does not interfere with mounting of the pillar garnish 20 on the pillar 10.

Also, in the embodiment, the movement limiting portion 33 is placed within the interior space 22 of the pillar garnish 20 such that the end of the movement limiting portion 33, that is, the anchor portion 33a, is not constrained (can freely move within the interior space 22). It is, thus, unlikely that the movement limiting portion 33 is twisted upon detachment and movement of the pillar garnish 20 away from the pillar 10. This makes it possible to enhance the break strength of the movement limiting portion 33.

Also, in this embodiment, the mounting device 30 includes the first engaging portion 31 at one end thereof, the second engaging portion 32 at an intermediate portion thereof, and the movement limiting portion 33 at the other end thereof. In the state where the movement limiting portion 33 is placed within the interior space 22 of the pillar garnish 20, it is possible to bring the second engaging portion 32 into engagement with the portion 22a of the interior space 22 of the pillar garnish 20. As the portion 22a is engaged with the second engaging portion 32, the structure of the pillar garnish 20 can be simplified, allowing easy mounting operation.

Also, in the embodiment, the movement limiting portion 33 includes the anchor portion 33a and the flexible portion 33b. The anchor portion 33a is provided at one end of the movement limiting portion 33 and engaged with the pillar garnish 20 so as to limit movement thereof. The flexible portion 33b is provided at a joint connecting the anchor portion 33a and the second engaging portion 32 of the movement limiting portion 33. When the pillar garnish 20 is detached from the pillar 10, the flexible portion 33b is capable of reducing the impact caused by the detachment of the pillar garnish 20. The engagement of the anchor portion 33a with the interior space of the pillar garnish 20 may reliably restrict movement of the pillar garnish 20 away from the pillar 10.

In the embodiment, the pillar garnish 20 as the interior part is mounted on the pillar 10 as the vehicle body. However, other interior part may be mounted on the vehicle body in the same manner as the foregoing embodiment or in the modified manner. In the embodiment, the flexible portion 33b has a curved portion at its center. However, such curve does not have to be provided at the center but other configuration may be employed. Further, while the curved portion is formed substantially in the middle of the flexible portion 33b in the embodiment, the embodiment may be implemented without such curved portion as one modification example. Also, the shape of each portion of the mounting device 30 may be modified when appropriate.

The invention claimed is:

1. A mounting structure adapted to mount an interior part for a vehicle on a body of the vehicle, comprising:
   a first engaging portion that is engaged with and fixed to the body of the vehicle, the first engaging portion being kept from being disengaged from the body of the vehicle under a predetermined load;
   a second engaging portion that is connected to the first engaging portion, the second engaging portion being engaged with and fixed to the interior part, and disengaged from the interior part under the predetermined load; and
   a movement limiting portion that is connected to the second engaging portion and stored in an interior space formed in the interior part in a state where the second engaging portion is engaged with the interior part, wherein
   the movement limiting portion limits a movement of the interior part away from the body of the vehicle by a distance that is equal to or greater than a predetermined distance when the second engaging portion is disengaged from the interior part so as to be moved away from the body of the vehicle
   wherein the movement limiting portion includes an end that serves as an anchor portion engaged with the interior part so as to limit the movement of the interior part, and a flexible portion that connects the anchor portion and the second engaging portion; and
   wherein the second engaging portion and the movement limiting portion have substantially flat shapes that extend in different directions.

2. A mounting structure according to claim 1, wherein the movement limiting portion has an end portion that is movable in the interior space where the movement limiting portion is kept.

3. A mounting structure according to claim 1, wherein the first engaging portion is provided on a first end of the mounting structure, the second engaging portion is provided on an intermediate portion of the mounting structure, and the movement limiting portion is provided on a second end of the mounting structure.

4. A mounting structure according to claim 1, wherein a direction in which the flat shape of the anchor portion extends is different from a direction in which the flat shape of the second engaging portion by substantially 90 degrees.

5. A mounting structure according to claim 1, wherein the first engaging portion, the second engaging portion and the movement limiting portion are formed on a single member.

6. A mounting structure according to claim 1 wherein the body of the vehicle is a pillar.

7. A mounting structure according to claim 1, wherein the interior part is a pillar garnish.

* * * * *